United States Patent [19]
Goebel et al.

[11] Patent Number: 5,776,276
[45] Date of Patent: Jul. 7, 1998

[54] METHOD FOR PRODUCING A PRESSURE SENSOR

[75] Inventors: Ulrich Goebel, Reutlingen; Andreas Thomae, Kirchentellinsfurt; Juergen Schwaiger, Reutlingen; Rolf Becker, Pfullingen; Andreas Fischer, Reutlingen, all of Germany

[73] Assignee: Robert Bosch GmbH, Stuttgart, Germany

[21] Appl. No.: 599,844

[22] Filed: Feb. 12, 1996

[30] Foreign Application Priority Data

Mar. 15, 1995 [DE] Germany ............ 195 09 250.3

[51] Int. Cl.$^6$ ................ B32B 31/26; G01L 1/14
[52] U.S. Cl. ................ 156/89; 73/715; 73/724; 361/283.4
[58] Field of Search ............. 156/89; 264/603, 264/614, 619; 73/715, 718, 719, 724, 725; 361/283.1, 283.4

[56] References Cited

U.S. PATENT DOCUMENTS

| | | | |
|---|---|---|---|
| 3,858,097 | 12/1974 | Polye | 73/724 X |
| 4,184,189 | 1/1980 | Davis et al. | 361/283.4 |
| 4,972,579 | 11/1990 | Yajima | 156/89 X |
| 4,972,717 | 11/1990 | Southworth et al. | |
| 5,349,492 | 9/1994 | Kimura et al. | 73/724 X |
| 5,381,299 | 1/1995 | Provenzano et al. | 73/724 X |
| 5,499,158 | 3/1996 | Bishop et al. | 361/283.4 |
| 5,525,280 | 6/1996 | Shukla et al. | 156/89 X |

FOREIGN PATENT DOCUMENTS

| | | |
|---|---|---|
| 39 01 492 | 1/1990 | Germany . |
| 88 15 425 | 5/1990 | Germany . |

*Primary Examiner*—Curtis Mayes
*Attorney, Agent, or Firm*—Kenyon & Kenyon

[57] ABSTRACT

In a method for producing a pressure sensor, a ceramic plate is joined to a shaped ceramic part. The shaped ceramic part has a depression. Around the depression there is provided a thick-layer paste which does not completely surround the depression. As a result, the air can escape from the depression during firing and a subatmospheric pressure can thus be enclosed in the depression.

6 Claims, 1 Drawing Sheet

METHOD FOR PRODUCING A PRESSURE SENSOR

BACKGROUND INFORMATION

The production of pressure sensors which have a membrane and operate against a reference volume is generally known. The reference volume encloses a defined pressure. Such sensors therefore operate as absolute pressure sensors.

SUMMARY OF THE INVENTION

The method of the present invention has the advantage that a particularly simple procedure is used for the production. The shaped ceramic parts and the ceramic plate for the membrane can each be processed separately before joining. It is also possible to manufacture a multiplicity of pressure sensors in parallel and, after joining the shaped ceramic parts and the ceramic plate, to divide them into individual sensors.

The sensor is produced much more simply by there being arranged between the ceramic plate and the shaped ceramic part a thick-layer paste which is then fired. The ceramic paste is applied particularly simply by screen printing. The difference volume can be particularly advantageously sealed if the ceramic paste does not completely surround the depression in the shaped ceramic part and the reference volume is hermetically sealed only on firing. In this way, a defined internal pressure can be enclosed in the reference volume. Furthermore, it is thus possible to enclose a pressure lower than normal atmospheric pressure in the reference volume. This improves the characteristic curve of the sensor. Particularly simply, the ceramic paste can be printed-on in the form of an annulus from which a segment has been cut. The use of a further shaped ceramic part having a pressure inlet enables the production in a simple manner of a complete sensor which can be utilized by the user without further packing.

DETAILED DESCRIPTION

Figure 1:
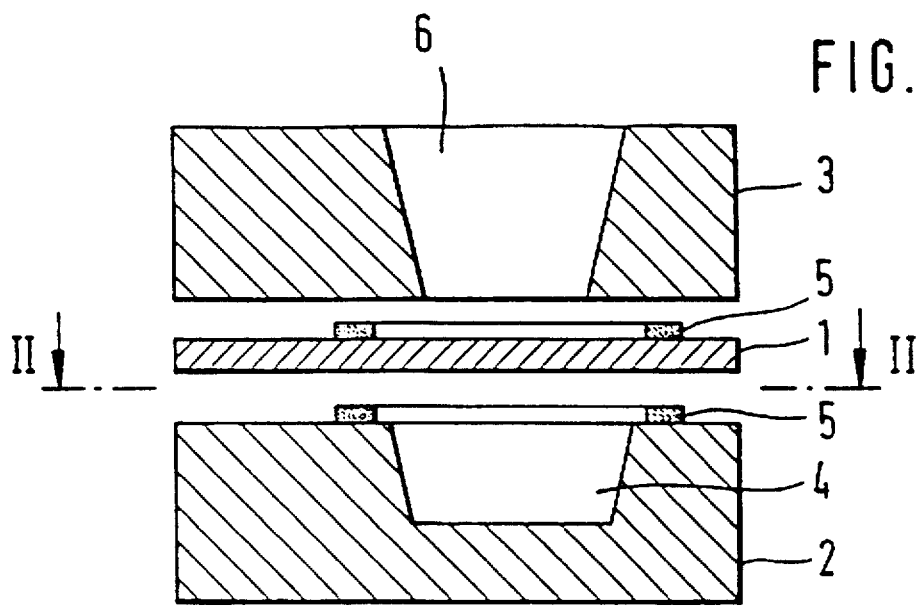
FIG. 1 shows a ceramic plate and two shaped ceramic parts prior to joining, according to the present invention.

FIG. 1 illustrates the production of a pressure sensor by the method of the present invention. For the pressure sensor, a ceramic plate 1 is joined to a shaped ceramic part 2. The shaped ceramic part has a depression 4 which is closed by the ceramic plate 1. The ceramic plate 1 thus forms, over the depression 4, a membrane which is deformable by a pressure. For this purpose, it is necessary for the depression 4 to be hermetically sealed so that the depression 4 forms a reference volume having an enclosed pressure. To detect the deflections of the membrane, the membrane is provided with resistances whose resistance changes as a function of the mechanical stresses in the membrane. These resistance elements are not shown here in the interests of simplicity.

Between the ceramic plate 1 and the shaped ceramic part 2 there is provided a thick-layer (ceramic) paste 5 for joining the ceramic plate 1 to the shaped ceramic part 2. If the ceramic plate 1 is laid on the shaped ceramic part 2 and the ceramic paste 5 is then hardened by a firing process, the ceramic plate 1 and the shaped ceramic part 2 are firmly bonded to one another. The joining is carried out in such a way that the depression 4 is hermetically sealed by the ceramic plate 1.

Typical firing processes for ceramic pastes are carried out at a few hundred degrees Celsius. The ceramic paste contains a glass which is melted in the course of the firing process and then serves as a connection between the ceramic plate 1 and the shaped ceramic part 2. In the course of the firing process, the depression 4 is hermetically sealed, i.e. made airtight. The pressure prevailing in the depression after firing depends on the point in time at which the airtight closure of the depression 4 occurs. If the depression 4 is already sealed so as to be airtight at the beginning of the firing process, heating builds up an overpressure which pushes the shaped ceramic part 2 and the ceramic plate 1 apart during the course of the firing process. This leads to impairment of the quality of the bond between the shaped ceramic part 2 and the ceramic plate 1. It is therefore desirable for the hermetic seal to be formed only at a relatively high temperature in the firing process.

Figure 2:
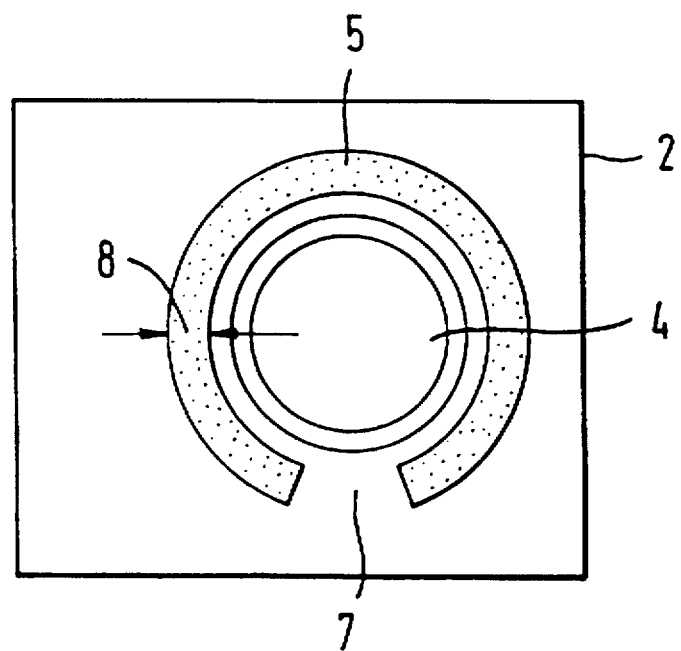
FIG. 2 shows a plan view of the shaped ceramic part along the line II—II of FIG. 1.

In FIG. 2, with the aid of a plan view of the shaped ceramic part 2 along the line II—II of FIG. 1, it is explained how a hermetic seal is formed only at a late stage of the firing process. For this purpose, the ceramic paste 5 applied to the upper side of the shaped ceramic part 2 does not completely surround the depression 4, but has a gap 7. The gap 7 enables the gas present in the depression 4 to escape during the firing process. Only in the last phase of firing, i.e. at the highest temperature reached in the firing process, does the glass present in the thick-layer paste 5 become liquid and become distributed, by means of capillary forces, between the ceramic plate 1 and the surface of the shaped ceramic part 2.

In this flow process, the glass material then also gets into the region of the gap 7 and effects hermetic sealing of the depression 4. In this way, hermetic sealing of the depression 4 and bonding of the shaped ceramic part 2 to the ceramic plate 1 are achieved in a single process step. To achieve hermetic sealing of the depression 4, the firing temperature, the composition of the ceramic paste 5, the size of the gap 7 and the width 8 of the thick-layer paste 5 applied have to be varied.

FIG. 2 shows that the ceramic paste 5 is applied as an annular structure from which a segment has been removed. Alternatively however, any other shapes of the ceramic paste 5 are also possible.

The ceramic paste 5 is generally applied by screen printing. This process has the advantage that the geometric dimensions of the ceramic paste 5 can be readily controlled.

FIG. 1 shows a further shaped ceramic part 3 which has a pressure inlet 6, i.e. an opening which extends from the upper side of the further shaped ceramic part 3 down to the membrane. The further shaped ceramic part 3 thus aids the access of the pressure to the membrane. Furthermore, the further shaped ceramic part 3 simplifies the handling of the actual sensor element, in particular the mounting of the pressure sensor is simplified in this way. Other geometric configurations of the pressure inlet 6 are also conceivable.

By means of the method of the present invention, a subatmospheric pressure is enclosed in the depression 4. Such a subatmospheric pressure is advantageous to the sensor, since the air enclosed in the reference volume is heated or cooled by changes in the temperature of the surroundings. This also changes the internal pressure of the reference volume. However, this effect is less, the lower the internal pressure in the reference volume.

What is claimed is:

1. A method for producing a pressure sensor comprising the steps of:
   forming a depression in a first shaped ceramic member;
   providing a thick-layer paste on at least one of a ceramic plate and the first shaped ceramic member;
   arranging the ceramic plate on top of the first shaped ceramic member, the thick-layer paste lying between the ceramic plate and the first shaped ceramic member; and
   sealing the depression at a preselected internal pressure by joining the ceramic plate to the first shaped ceramic member, the sealed depression defining a reference volume,
   wherein the ceramic plate and the first shaped ceramic member are joined by firing the thick-layer paste, and
   wherein the thick-layer paste does not completely surround the depression prior to firing, the thick-layer paste becomes fluid upon firing, and the fluid flows around the depression.

2. The method according to claim 1, wherein the thick-layer paste is applied by screen printing and is in a shape of an annulus having a gap.

3. The method according to claim 1, wherein the thick-layer paste is printed in a shape of an annulus from which a segment has been cut.

4. The method according to claim 1, further comprising the step of:
   joining a second shaped ceramic member to the ceramic plate, the second shaped ceramic member having a pressure inlet leading to the ceramic plate.

5. The method according to claim 4, wherein:
   the second shaped ceramic member is disposed above the ceramic plate which is, in turn, disposed above the first shaped ceramic member; and
   the pressure inlet is located above the depression, on a side of the ceramic plate opposite to the depression.

6. The method according to claim 1, wherein the preselected internal pressure of the depression is a subatmospheric pressure.

* * * * *